United States Patent [19]

Calvert et al.

[11] 4,396,049

[45] Aug. 2, 1983

[54] BACKUP ROLL ARRANGEMENT FOR WOOD VENEER LATHE

[75] Inventors: Harry B. Calvert, Longwood, Fla.; Dewell M. Nelson, Riverdale, Ga.

[73] Assignee: Calvert Manufacturing, Inc., Longwood, Fla.

[21] Appl. No.: 231,871

[22] Filed: Feb. 5, 1981

[51] Int. Cl.³ ............................................. B27L 5/02
[52] U.S. Cl. ............................... 144/209 R; 364/174
[58] Field of Search ............... 144/209 R, 209 A, 211, 144/212, 213; 364/478, 174

[56] References Cited

U.S. PATENT DOCUMENTS

| | | | |
|---|---|---|---|
| 2,340,532 | 2/1944 | Jackson et al. | 144/209 |
| 2,501,387 | 3/1950 | Haumann | 144/209 |
| 2,766,786 | 10/1956 | Molyneux | 144/209 |
| 2,844,966 | 5/1959 | Zilm | 144/209 |
| 3,052,272 | 9/1962 | Yock | 144/209 |
| 3,139,004 | 6/1964 | Haumann | 91/167 |
| 3,176,735 | 4/1965 | Pelto | 144/209 |
| 3,198,226 | 8/1965 | Haumann | 144/209 |
| 3,244,206 | 4/1966 | Bossen | 144/209 |
| 3,349,820 | 10/1967 | Nagaoka | 144/209 |
| 3,372,721 | 3/1968 | James et al. | 144/209 |
| 3,421,560 | 1/1969 | Springate | 144/209 |
| 3,455,354 | 7/1969 | Calvert | 144/209 R |
| 3,515,186 | 6/1970 | Nagaoka | 144/209 |
| 3,654,973 | 4/1972 | Koss | 144/178 |
| 3,670,790 | 6/1972 | Porter et al. | 144/213 |
| 3,680,613 | 8/1972 | Daniels et al. | 144/209 R |
| 4,061,169 | 12/1977 | Hasegawa | 144/213 |
| 4,073,326 | 2/1978 | Pank et al. | 144/209 R |
| 4,197,888 | 4/1980 | McGee et al. | 144/209 A |
| 4,221,247 | 9/1980 | Katsuji | 144/211 |
| 4,234,024 | 11/1980 | Koike | 144/213 |

Primary Examiner—W. D. Bray
Attorney, Agent, or Firm—Leydig, Voit, Osann, Mayer & Holt, Ltd.

[57] ABSTRACT

A backup roll arrangement for peeling veneer from a log in a wood veneer lathe which includes a backup roll rotatably mounted on a carriage driven by a dc motor toward the center of the log during a veneer peeling operation. A control system coordinates the position of the backup roll with the position of a veneer knife blade on a knife carriage as it advances toward the axis of the rotating log to peel veneer. The backup roll is positioned intermediate the ends of the log and is controlled to be fed toward the log axis in coordination with the knife so as to prevent bending or bowing of the log core, particularly during the later stages of the veneer peeling operation. The backup roll assembly has a frame mounted generally above the veneer lathe such that as the backup roll carriage moves downwardly, the axis of rotation of the backup roll moves toward the axis of rotation of the log at a constant small angle from vertical.

4 Claims, 15 Drawing Figures

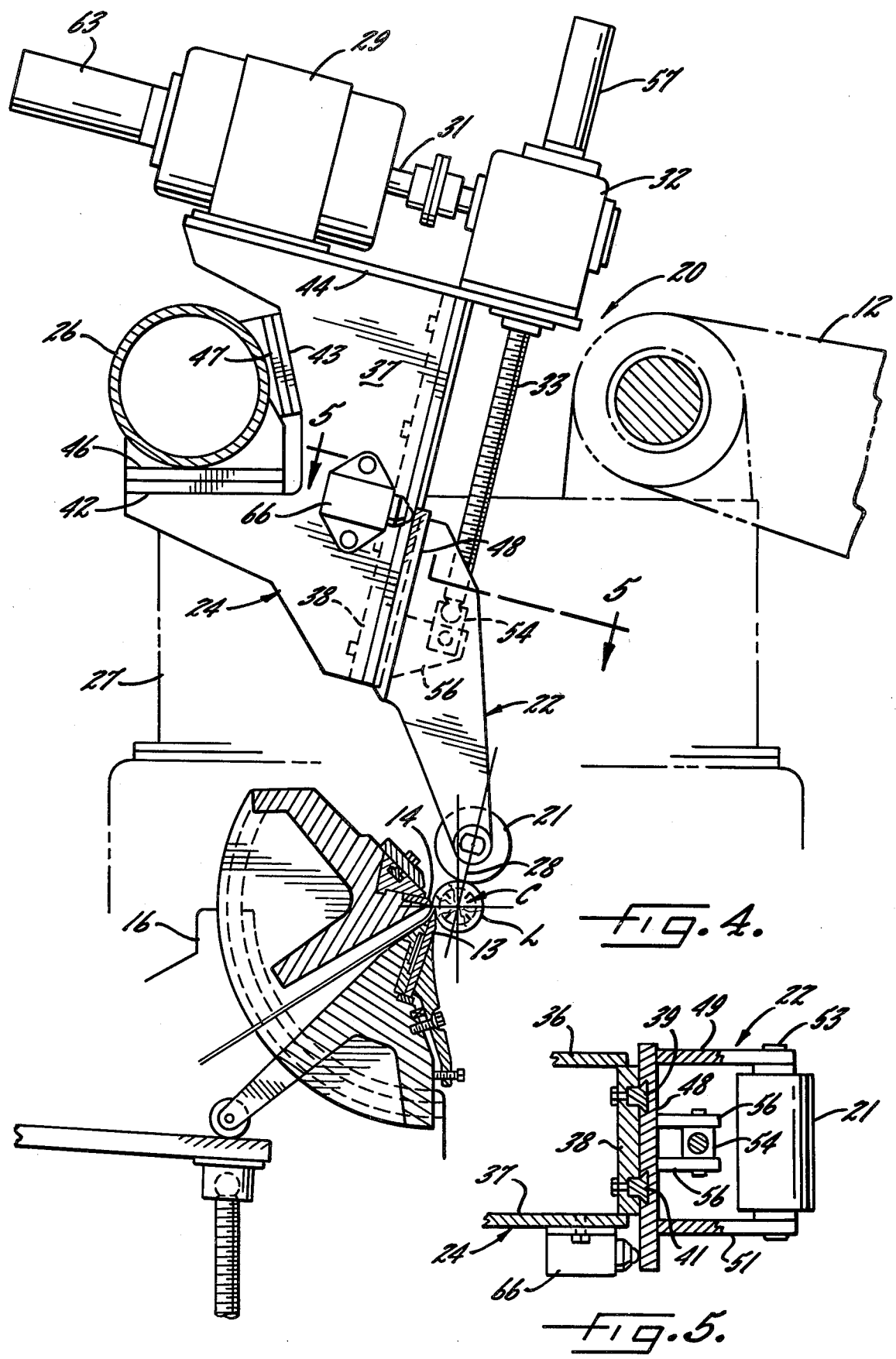

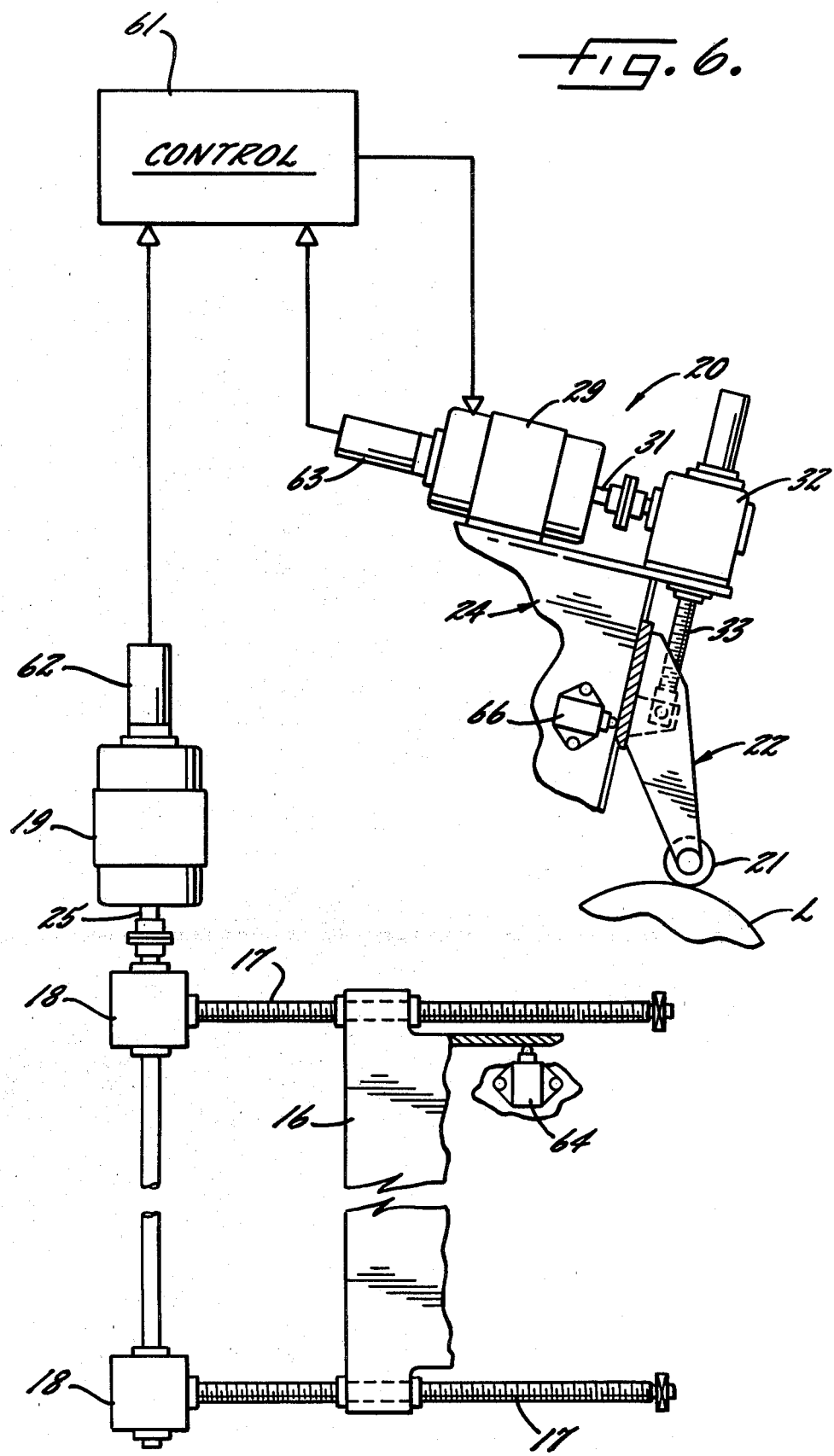

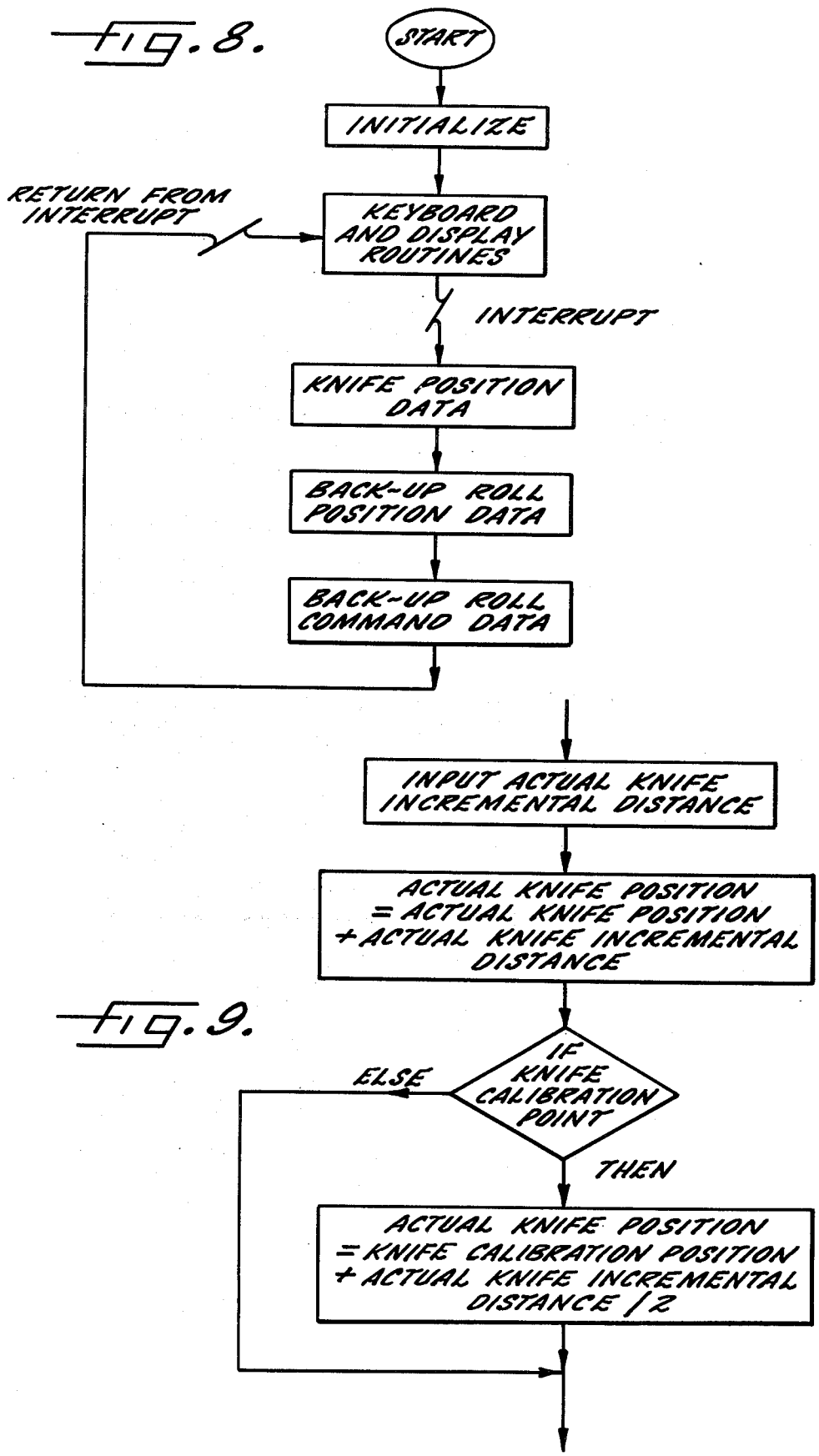

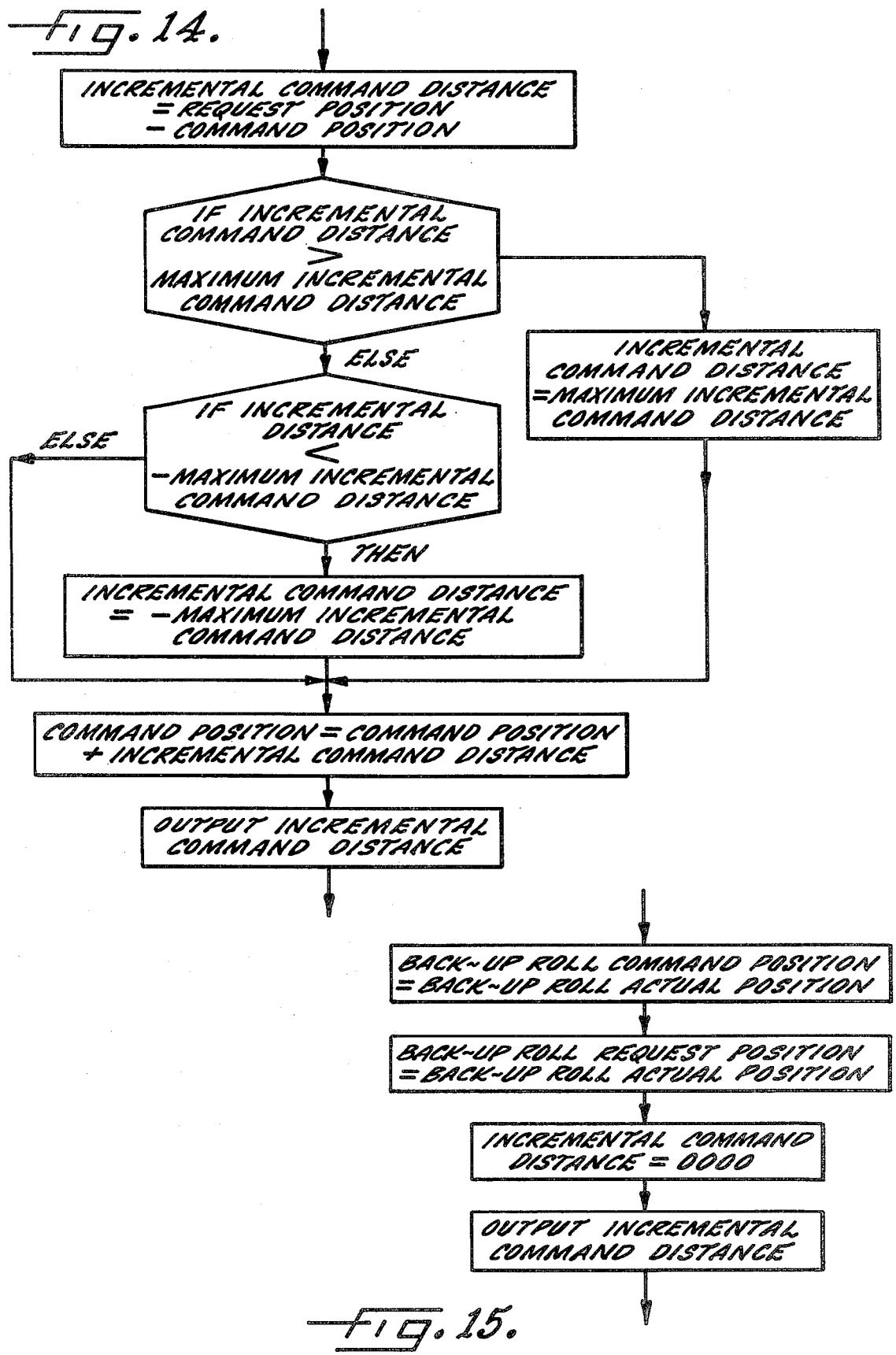

BACKUP ROLL ARRANGEMENT FOR WOOD VENEER LATHE

DESCRIPTION OF THE INVENTION

This invention relates generally to wood veneer lathes and more particularly concerns a backup roll arrangement therefor.

In a typical veneer lathe a pair of axially spaced headstocks each contain a pair of power driven, axially extensible, spindles telescoped within one another. A charger associated with the veneer lathe is adapted to load a log or "block" into the lathe. The log, which may be on the order of 102 inches in length, is moved by the charger into approximate axial alignment with the spindles. The chucks are then moved axially into driving engagement with the ends of the log. A veneer knife and associated pressure bar, both about 110 inches in length so as to overhang the ends of the log, are mounted on a knife carriage which is driven along parallel guideways extending transversely of the spindle axis.

The log is driven through the spindles and chucks to rotate about its longitudinal axis while the knife engages its surface to peel a thickness of wood veneer which passes between the knife blade and the pressure bar. The knife and pressure bar are moved radially toward the longitudinal axis of rotation of the spindles and log so that the veneer is peeled therefrom in a spiral. The spacing between the desired blade and the pressure bar is adjusted in accordance with the veneer thickness.

With the knife blade oriented at a small acute angle to the vertical, there is a similarly oriented reactive force in the log in response to the rotation of the log into the knife blade. There is also a horizontal reactive force due to the feed of the knife and pressure bar toward the axis of rotation of the log. These reactive forces vary depending upon factors such as the hardness or softness of the log and the veneer thickness being cut. The angle of this reactive force may be described as the angle between two planes through the axis of rotation. One plane is the vertical plane, and the other plane is parallel to the resultant of the reactive forces. The resultant reactive force angle is about 13° for softwoods and 16° to 17° for hardwoods. Since the log is typically more than 8 feet in length and only mounted at its ends, the log of itself is not sufficiently rigid, particularly once it has been peeled beyond a diameter of about 15 inches, to withstand these reactive forces at its center. Therefore, a backup roll is employed to prevent the deflection of the longitudinal center portion of the log during the veneer peeling operation.

Ideally, a backup roll maintains the central portion of the log in alignment with its end portions so that a substantially cylindrical log core is produced at the conclusion of a veneer peeling operation. If the backup roll pressure is insufficient to offset the longitudinal deflection forces, the core will be of a "cigar" shape as the log center bows away from the knife blade. If the backup roll overcompensates for the deflection forces, it presses the log center into the knife, and a core is produced which has an "hourglass" shape. In either event the veneer peeled from the log during this time is uneven, and hence of inferior quality, and in an extreme case must be scrapped. Further, the value of the core remaining at the end of the veneer peeling operation is greatest for a cylindrical core, and so there is a further disadvantage in regard to an improperly backed log.

A commercially important form of rotary veneer lathe is a high speed lathe for producing veneer for plywood from soft woods. The typical veneer sheet feed from such a lathe is on the order of 1200 feet per minute with spindle rotational speeds in the range of up to 400 to 500 revolutions per minute. Initial log diameters for such lathes range generally from 12 to 30 inches in diameter. Such a lathe can peel between 5 and 10 logs per minute, with each log reduced to an approximately 4 and ½ inch core.

In recent years, as wood has become more precious, it has become more desirable to minimize the diameter of the peeled core. Cores having 4 inch diameters and less are desirable. In such veneer lathes, wherein small diameter cores are produced, an accurately applied and controlled backup roll is necessary to prevent spin-outs of peeled logs from the spindle chucks and to maintain good control of peel thickness. The backup roll should be applied generally along the abovementioned reactive force angle in order to best offset the reactive forces and must be precisely controlled as to its infeed to produce a cylindrical core.

An early application of backup rolls was to offset the horizontal feed forces of the knife and pressure bar. Typical of these arrangements are the backup rolls shown in U.S. Pat. No. 2,766,786 to Molyneux and 2,340,532 to Jackson. These backup rolls were large, extending the entire length of the log, and moved on horizontal ways to urge the roll under pressure against the log during veneer peeling. The backup roll in Molyneux is mounted on a carriage which is fed toward the log using the same feed screws as carry the knife carriage. These backup rolls do not deal with the entire problem of counter-acting reactive forces since such reactive forces act at an angle of generally less than 20° from vertical.

Hydraulic backup rolls have been used to offset the reactive forces in a log during veneer peeling, typically by applying a pair of rollers on a swivel head to the central portion of the log under a selected hydraulic pressure. Examples of such arrangements are shown in U.S. Pat. Nos. 3,515,186 to Nagaoka and 2,884,966 to Zilm.

It is advantageous for uniform peeling to follow the progress of the veneer knife into the log with the backup roll since it is impossible to set the hydraulic pressure individually for each log. U.S. Pat. No. 3,421,560 to Springate shows a hydraulic backup roll arrangement which further provides a cam surface on the knife carriage which is tracked by the backup roll assembly to set a maximum amount of infeed for the backup roll. U.S. Pat. No. 3,455,354 to Calvert shows a hydraulic backup roll arrangement wherein a follower roller follows the contour of the log at one of its ends adjacent the chuck. The follower roller hydraulically controls the backup roll so as to tend to maintain the center of the log in alignment with its ends. U.S. Pat. No. 3,372,721 to James, et al. shows a slightly different hydraulic backup roll arrangement wherein hydraulic followers associated with the knife carriage hydraulically control the positioning of two independent backup rolls on a single head. In James, et al. the two backup rolls are mounted at the end of an arm which swings in an arc to position the backup rolls each time the log being peeled reaches a set diameter.

In a high speed rotary veneer lathe it is important for precise veneer thickness control down to small log diameters to support the log center with a backup roll arrangement which applies backup pressure in a consistent linear direction through the log rotational axis as the log is peeled and which is controlled extremely accurately to track with the knife into the log. Such a backup roll arrangement must be capable of high speed reciprocation, such as five to ten cycles per minute, over extended periods of time with little adjustment or maintenance. In each cycle of reciprocation it is desirable that a backup roll trach the progress of the knife toward the log rotational axis more precisely than in known hydraulic arrangements, which typically permit roll position variations on the order of one quarter to one eighth of an inch.

It is therefore an object of the present invention to provide a backup roll arrangement for a rotary veneer lathe capable of high speed operation wherein the backup roll is consistently applied on a line passing through the axis of rotation of the log and spindles, and wherein the position of the backup roll is accurately coordinated with the knife position and hence the log diameter.

Other objects and advantages of the invention will become apparent upon reading the following detailed description and upon reference to the drawings, in which:

FIG. 4 is a sectional view similar to that of FIG. 3 showing the operative position of the backup roll assembly when the log has been peeled to approximately core size;

FIG. 5 is a transverse sectional view taken in the plane of the line 5—5 of FIG. 4;

FIG. 6 is a schematic diagram of the control connections for the backup roll assembly of FIGS. 1 through 5;

FIG. 8 is a summary flow chart of the software operation of the control of FIG. 6;

FIG. 9 is a flow chart of the knife position data subroutine of FIG. 8;

FIG. 14 is a flow chart of the determine incremental command distance subroutine of FIG. 11; and FIG. 15 is a flow chart of the motor off mode subroutine of FIG. 11.

Figure 1:
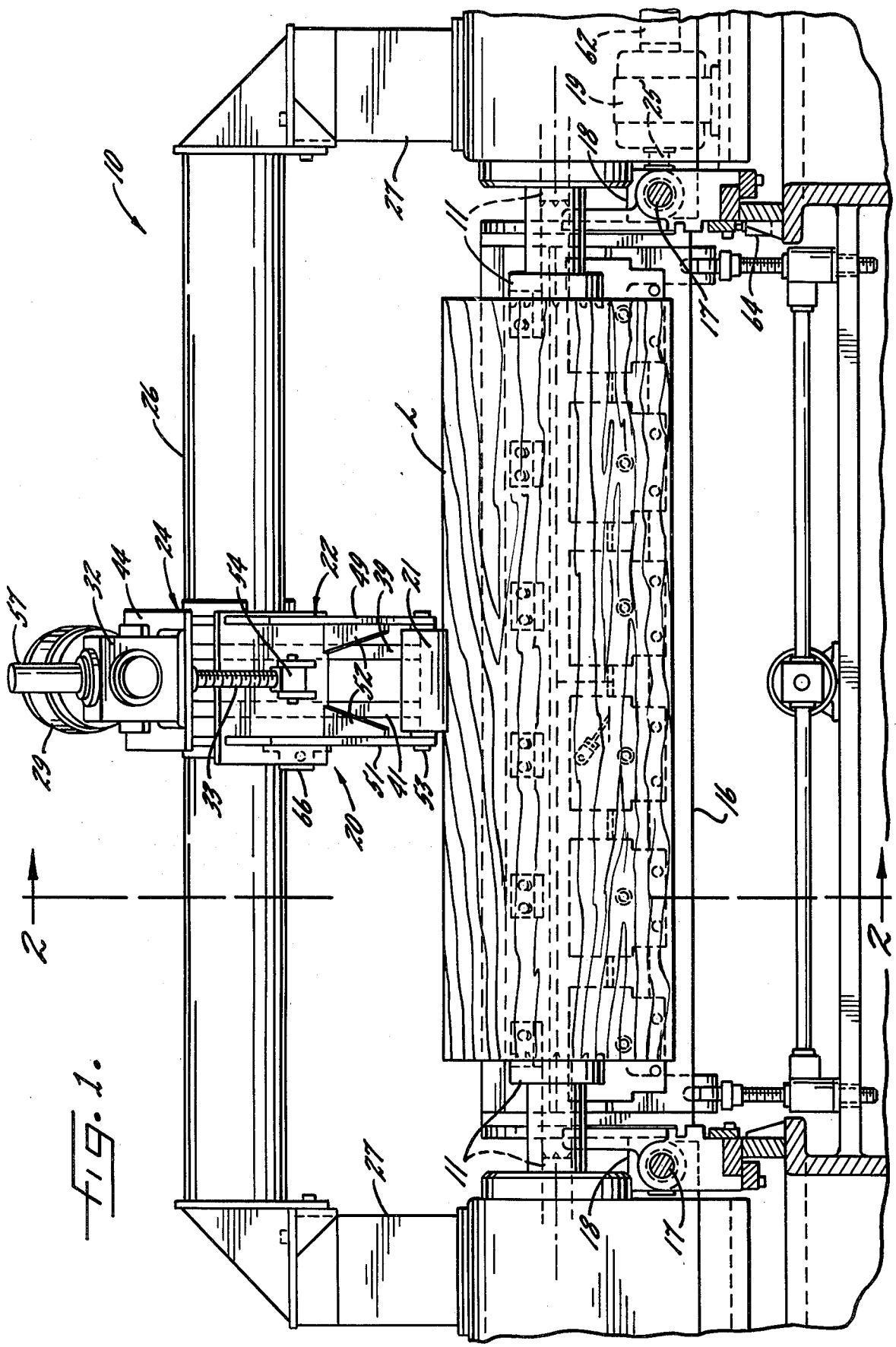
FIG. 1 is a fragmentary front elevational view of a veneer lathe including a backup roll arrangement in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives, falling within the spirit and scope of the invention as defined by the appended claims.

With initial reference to FIGS. 1 through 5, a dual spindle veneer lathe 10 has a pair of axially spaced head stocks each containing a pair of power driven, axially extensible spindles 11 telescoped one within the other. The inner spindle has a chuck on the order of 4 inches, or less, in diameter and the outer spindle has a chuck on the order of 6 and ½ inches in diameter. A charger 12 (FIG. 3) associated with the lathe is adapted to load a log L or "block" into the lathe. The log, which may be on the order of 102 inches in length, is moved by the charger into approximate axial alignment with the spindles. The chucks are then moved axially into driving engagement with the ends of the log. A veneer knife 13 and pressure bar 14, both about 110 inches in length so as to overhang the ends of the log, are mounted on a knife carriage 16 which is driven along parallel guideways extending transversely of the spindle axis.

Figure 2:
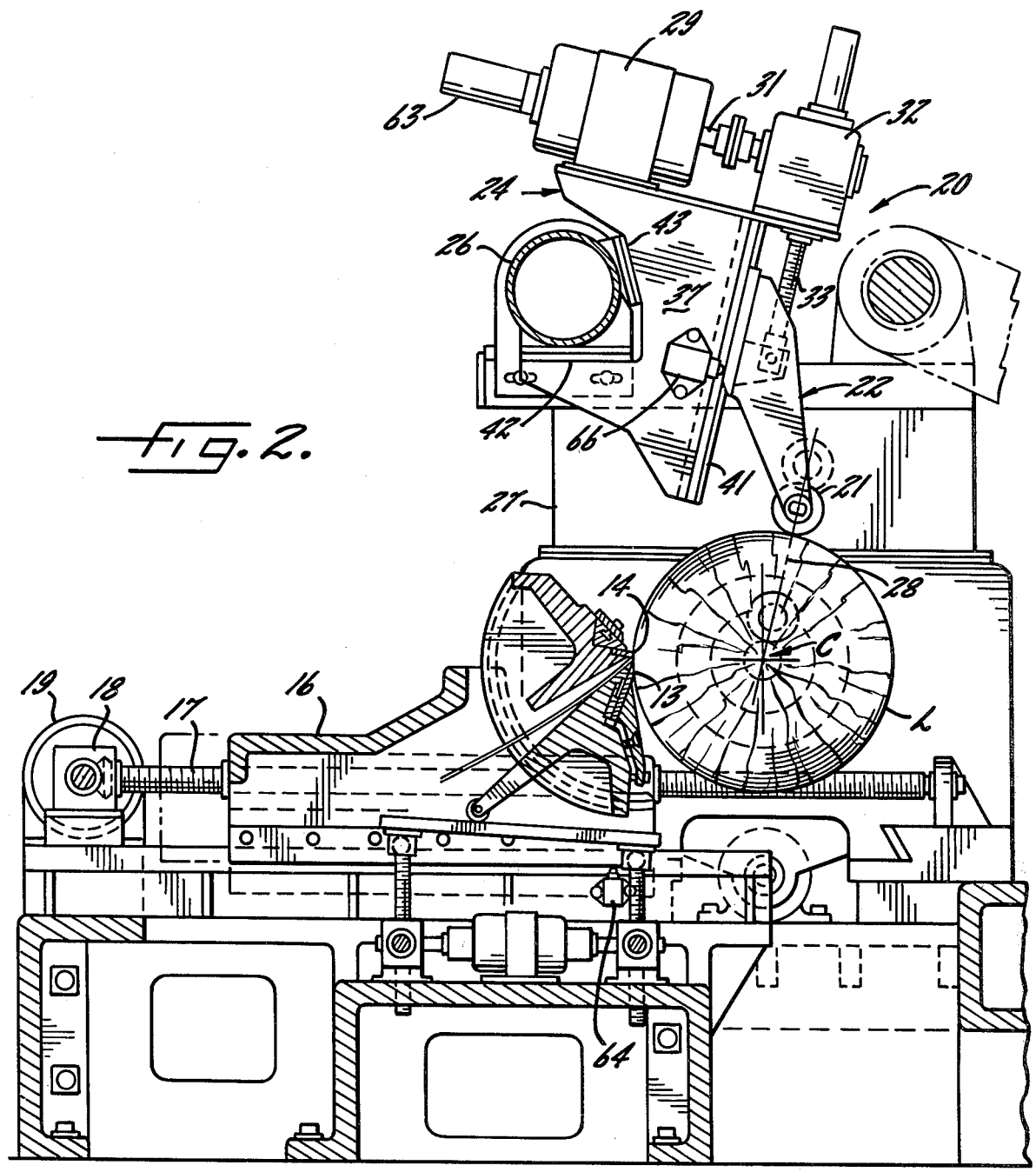
FIG. 2 is a vertical sectional view taken in the plane of the line 2—3 of FIG. 1.
Figure 3:
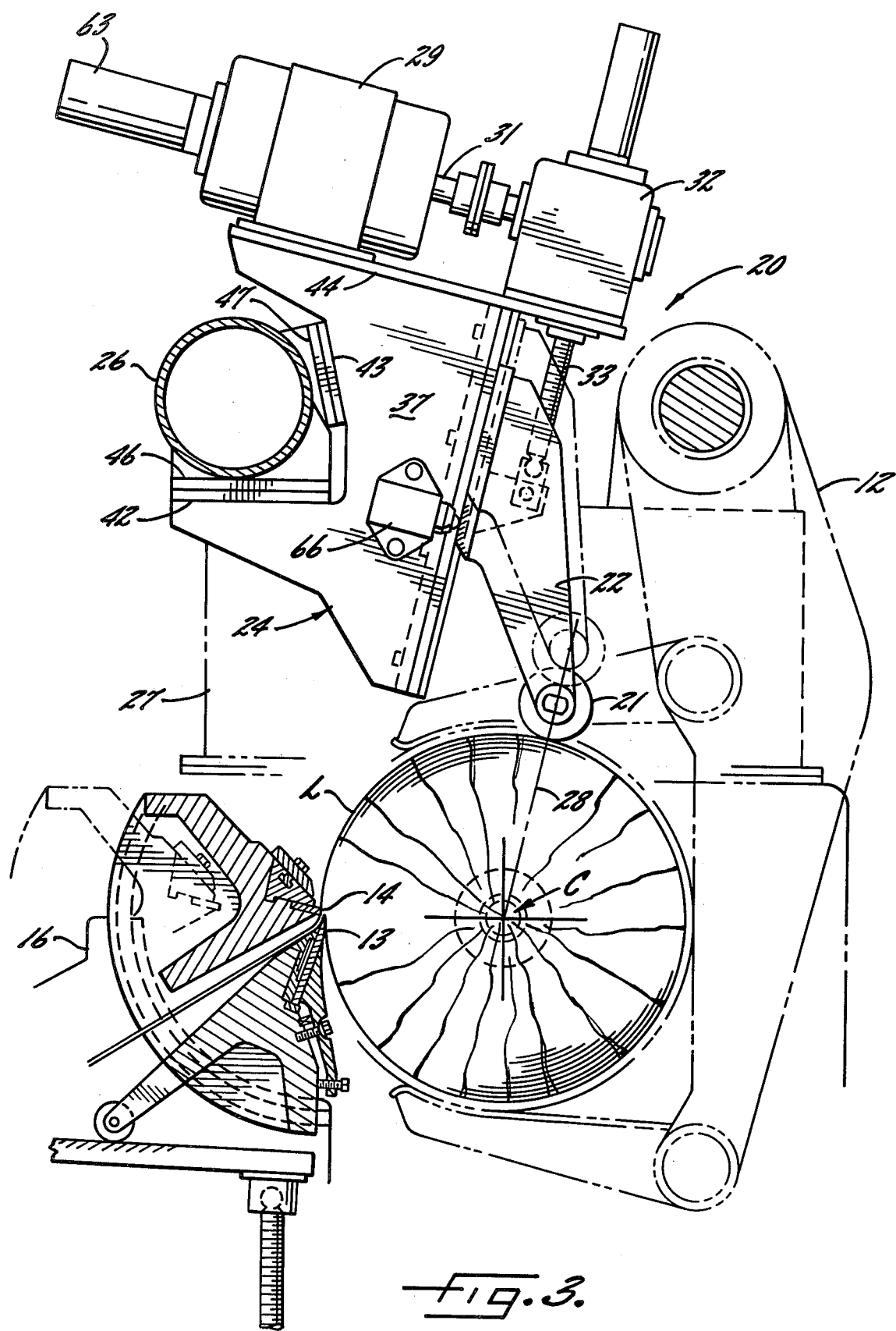
FIG. 3 is an enlarged fragmentary vertical sectional view similar to FIG. 2 showing the backup roll assembly in engagement with a log as originally loaded into the lathe from a charger.

As the log L is rotated by the spindles 11, counterclockwise in FIGS. 2 through 4, the knife 13 and the pressure bar 14 are fed toward the axis of rotation of the log at a rate synchronized with the rate of rotation of the spindles to peel a sheet of veneer therefrom. In order to feed the knife and pressure bar toward the log's rotational axis, the knife carriage 16 is carried upon lead screws 17, which are driven through gear boxes 18 by the drive shaft 25 of the bi-directional dc servo motor 19. The motor 19 driving the knife carriage 16 may be coordinated with the spindle drive as described in U.S. patent application Ser. No. 149,527, filed May 13, 1980, and entitled Veneer Lathe Control System now U.S. Pat. No. 4,287,462.

As thus far described the veneer lathe 10 is typical of a lathe used for high-speed veneer peeling for soft logs. In order to prevent the log L from deflecting at reduced diameters as a result of the forces produced in veneer peeling, to provide veneer of accurately controlled thickness, and to produce substantially cylindrical cores, a backup roll assembly 20 in accordance with the invention is provided on the veneer lathe 10 (FIGS. 2-5). The backup roll assembly 20 includes a backup roll 21 journaled within a carriage 22 mounted to reciprocate along an inclined guideway on a mounting bracket 24 spaced well above the spindle axis. The mounting bracket 24 is rigidly attached to a support bar 26 extending between a pair of pedestals 27 attached respectively to the headstocks.

The carriage 22 and the backup roll 21 are disposed to move along an axis 28 passing through the rotational center C of the spindles and the log, the axis 28 being inclined at an angle of about 13° from vertical toward the front of the lathe. This axis 28 represents the plane of forces tending to deflect the log, as the knife peels the veneer therefrom, for soft woods in a high speed veneer lathe. The range of angles for various woods is between about 11° and 18°, with an angle of about 13° having been found to be best for soft woods and an angle of about 16° to 17° for hard woods.

The backup roll carriage 22 is driven along its guideway by means of a bidirectional dc servo motor 29. The servo motor drive shaft 31 is coupled to a ball screw gear box 32 which drives a ball screw 33 attached to the backup roll carriage 22. The servo motor 29 drives the ball screw 33 through the gear box 32 to move the carriage 22 downwardly as the log diameter decreases during the veneer peeling operation so that the backup roll 21 tracks the periphery of the log intermediate its ends to prevent deflections.

The mounting bracket 24 for the backup roll assembly includes a pair of side plates 36 and 37 fixed as by welding to a connecting front plate 38 which carries a pair of guides 39 and 41 for the backup roll carriage 22 (FIGS. 3-5). The mounting frame 24 is further defined by a pair of rear plates 42 and 43 fixed to, and spanning the gap between the side plates 36 and 37. A top plate 44 is also fixed to the frame and carries the drive motor 29 and gear box 32 for driving the feed screw 33 for the roller carriage. The rear plates 42 and 43 are rigidly attached through intervening plates 46 and 47 to the support bar 26.

The bracket 24 is oriented relative to the cross bar 26 such that the rear plate 38 is inclined at a desired angle for the application of backup force to the log. As indicated previously, for soft woods this would be approximately 13° from vertical. The carriage 22 includes a backplate 48, the rear portion of which defines channels receiving the guide rails 39 and 41 so that the backplate 48 rides on the guide rails as it moves in a plane at the aforementioned 13° angle from vertical. The carriage 22 further includes a pair of side plates 49 and 51 welded or otherwise fixed to the back plate 48 and supported relative thereto by struts 52. The backup roll 21 is journaled on shaft 53 which spans spindles the lower ends of plates 49 and 51.

In order to move the backup roll carriage 22 along the inclined plane of the plate 38, the lead screw 33 is rotatably retained in a block or socket 54 attached to a pair of mounting plates 56 fixed to the backplate 48 of the carriage. As the lead screw 33 is rotated by the motor 29 through the gear box 32, the lead screw moves up and down (at the aforementioned angle) with its upper end moving into and out of a cover 57. The backup roll carriage 22 is consequently moved along with the screw 33 upwardly and downwardly along the guide rails 39 and 41.

In order to position the backup roll 21 adjacent the log surface, and in coordination with the knife location during the veneer peeling operation, a control 61 (FIG. 6) coordinates the motion of the dc servo motor 29 for the backup roll with that of the dc servo motor 19 for the knife carriage 16. If there were no log deflection during the veneer peeling operation the log diameter at any given time would be determinable from the position of the knife blade 13 and the log diameter would be constant along its length. Since the log is mounted at its ends in spindles it functions somewhat as a beam in responding to the veneer peeling forces. The log thus tends to deflect centrally while its ends are held fixed in the chucks. Therefore, in order to resist the log deflection forces, the backup roll 21 is positioned intermediate the ends of the log with its log-contacting face at a distance from the log rotational axis approximately equal to that of the knife blade. Since in the illustrated lathe the roller is off-set angularly from the knife blade by about 103°, the theoretical roller-log interface point is slightly further from the rotational center than is the knife blade. This slight theoretical difference may be compensated for in the control. With the backup roll directed to move at the appropriate angle toward the center of the log, and tracking the progress of the knife blade toward the rotational center, the log is maintained substantially cylindrical and a uniform veneer sheet is peeled therefrom, leaving a substantially cylindrical core.

In order to coordinate the movement of the backup roll with that of the knife blade, the rotation of the drive shaft 31 of the roller carriage motor 29 is coordinated with the rotation of the drive shaft 25 of the knife carriage motor 19. In order to do this a pulse generator 62 is coupled to the drive shaft 25 causing pulses to be transmitted to the control 61 as the drive shaft rotates. In the present instance, the pulse generator 62 is a two-line pulse generator, with each line having a phase difference relative to the other, so that the direction of rotation of the shaft 25, and hence the direction of motion of the knife carriage 16, can be detected. Typically each line receives 1500 pulses per shaft revolution. A pulse generator 63 coupled to the drive shaft 31 for the roll carriage motor 29 operates substantially identically to the pulse generator 62 to produce pulses representative of the direction and degree of roller carriage motor shaft rotation. Thus, the control 61 receives pulse information accurately reflecting the movements of the backup roll 21 and the veneer knife blade 13.

In order to establish a reference point for the control for the knife carriage 16, and hence the knife blade 13, a limit switch 64 is located beneath the knife carriage 16 in the line of travel of the carriage as it moves toward the log L (FIG. 6). The limit switch 64 which, is conveniently positioned to be contacted prior to the knife blade making contact with the log, provides a signal to the control 61 during calibration. When the signal is received the reference point is established in the control, from which point movement of the knife carriage 16 and drive shaft 25 are referenced. In setting up the veneer lathe-backup roll assembly the position of the knife when the switch 64 is first contacted is stored in a memory in the control.

Similarly, to establish a reference position for the backup roll 21, a limit switch 66 is mounted on the backup roll support bracket 24 and positioned to engage a portion of the rear surface of the backplate 48 of the roll carriage 22. As the roll carriage moves downwardly from its uppermost position, conveniently before the roller 21 makes contact with the log, the leading edge of the carriage backplate engages the switch 66, providing a reference signal to the control 61. Again, when the lathe is set up with the backup roll arrangement thereon, the position of the roll 21 at the time the switch 66 is first contacted is stored in a memory in the control 61.

The control 61 is therefore operable to monitor the instantaneous position of the knife carriage 16 and of the roll carriage 22. In response to the knife position information the control 61 continuously sets the armature current for the roll drive motor 29 in order to effect tracking of the backup roll 21 with the knife blade 13 toward the axis of rotation of the log.

The control 61 is a hardware system which includes a microprocessor based portion, the latter generating a command signal used by the hardware to control the backup roll motor drive. The knife position pulse information from the pulse generator 62 is coupled through appropriate interface circuitry to the microprocessor-based control section, which in turn produces the command signal. In the present instance the microprocessor is an Intersil IM 6100 microprocessor.

With reference now to FIG. 8, the basic routine for the microprocessor is illustrated in flow chart form. The generation of backup roll position command signals is performed on an interrupt basis about once every 11 milliseconds. The microprocessor background routine begins with starting and initializing its registers and the like. After the various registers have been initialized, the microprocessor reads data input from the keyboard and updates the displays and continues in this mode between interrupts. Typically, the control is embodied in an enclosed hardware rack and includes a control panel having the various displays and keyboard input means to input parameters to the control.

The interrupt sequence includes determining a knife position and a backup roll position and generating a backup roll command. The backup roll command is used in the hardware portion of the control system to ultimately control the armature current to the backup roll drive motor 29. Each of the three interrupt subroutines shown in FIG. 8 shall now be described in further detail.

With reference first to FIG. 9, the actual knife incremental distance moved since the last interrupt, based upon the number of pulses from the pulse generator 62, is added to the previously determined actual knife position value to produce a current actual knife position value. If the knife is not at a calibration point, which would mean that the switch 64 has been activated since the last interrupt period, the processor proceeds to the BACKUP ROLL POSITION DATA subroutine. Typically the microprocessor only checks for the knife calibration point the first time the limit switch 64 is activated following start and initialization of the system. Thereafter, the IF KNIFE CALIBRATION POINT branch is bypassed. If the knife calibration point is encountered in the first cycle of the system after initialization, the actual knife position is established as the stored knife calibration position plus one half of the just-recorded actual knife incremental distance, divided by two. This approximates the average distance past the calibration point that the carriage and knife have travelled since the previous interrupt period, at which time the limit switch had not been activated.

Figure 10:
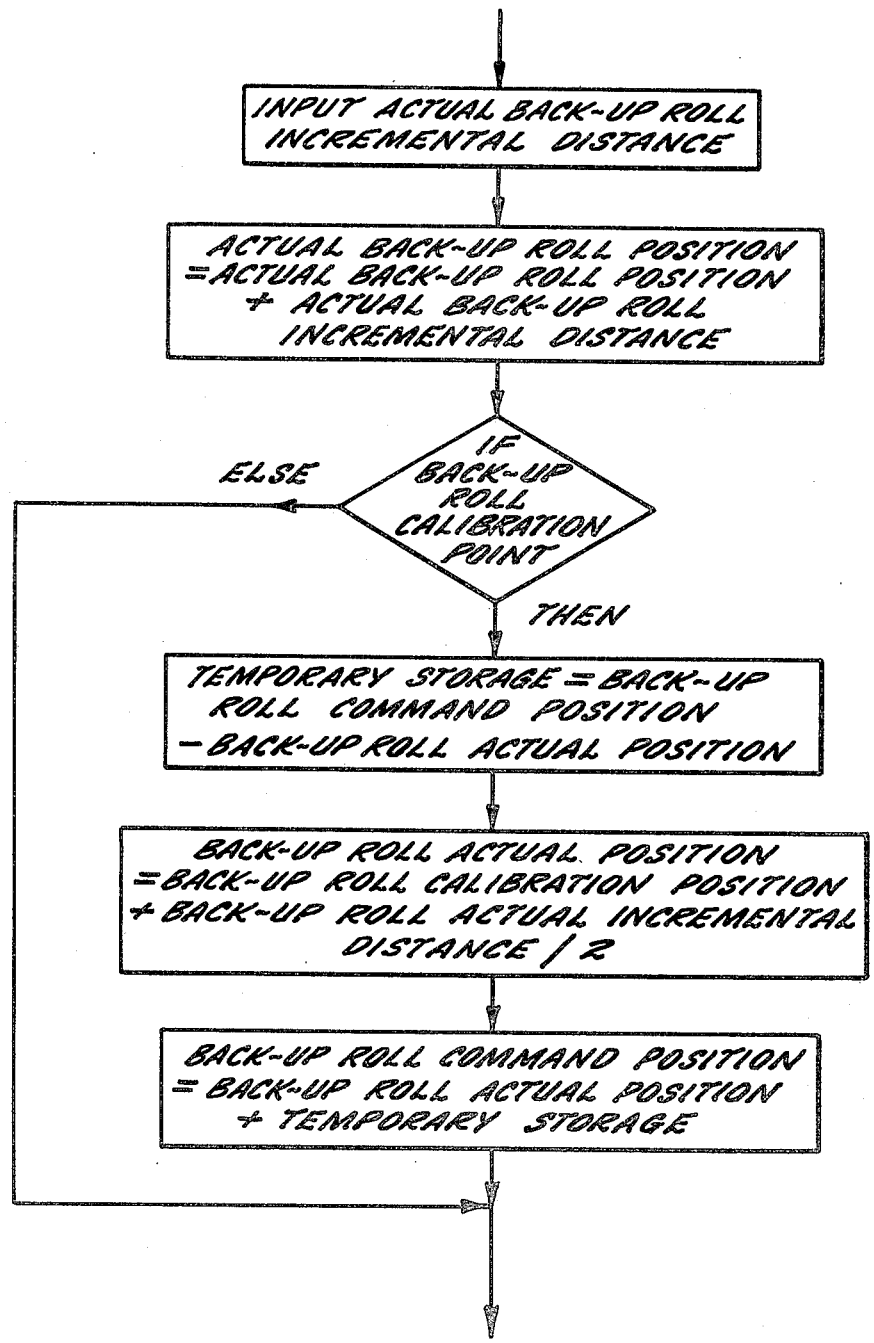
FIG. 10 is a flow chart of the backup roll position data subroutine of FIG. 8.
Figure 11:
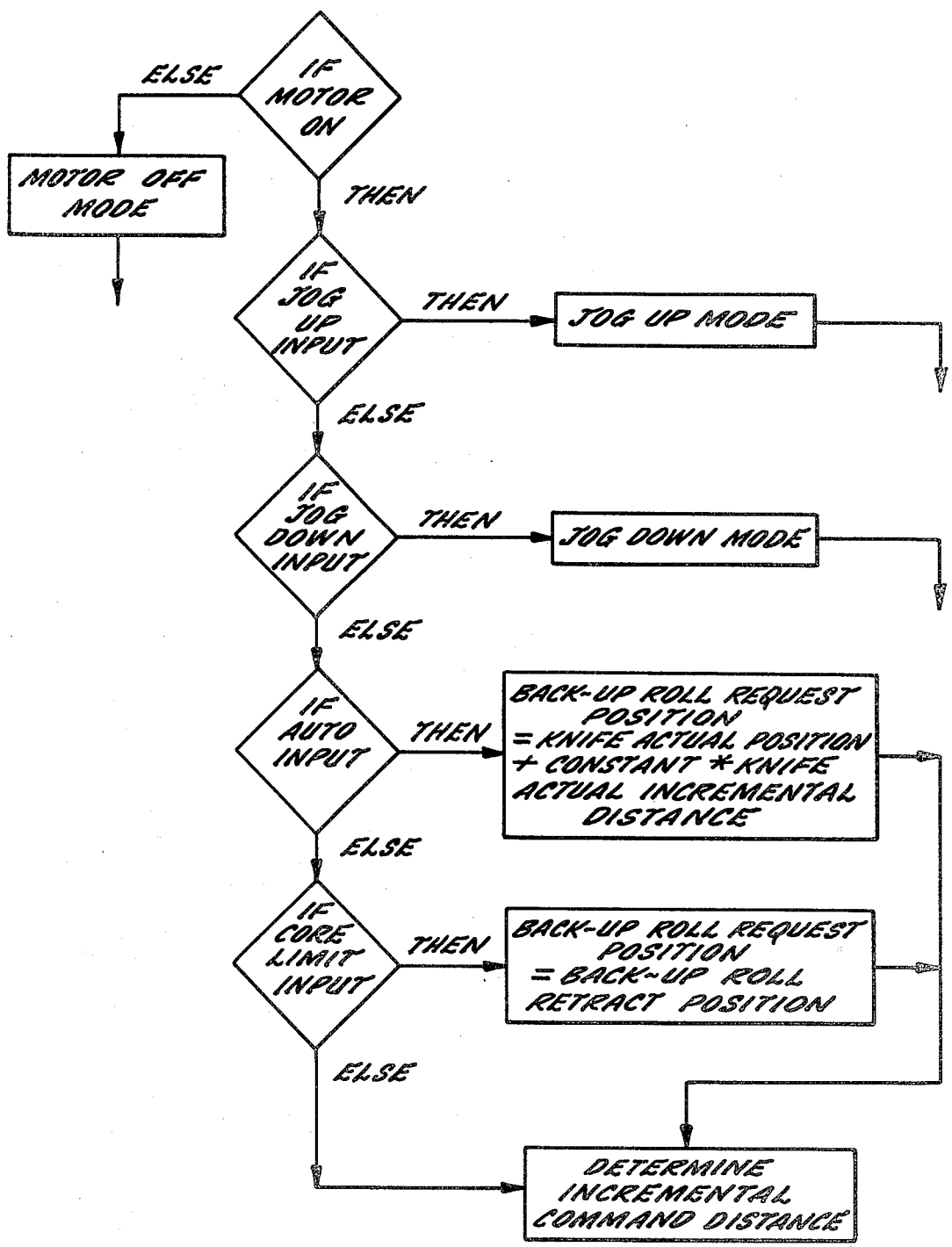
FIG. 11 is a flow chart of the backup roll command data subroutine of FIG. 8.

After the actual knife position has been determined, the backup roll position is determined, as indicated in FIG. 10. The actual backup roll incremental distance since the previous interrupt, based upon the pulses received from the pulse generator 63, is added to the previously determined actual backup roll position to produce a current actual backup roll position. If the backup roll is not at the calibration point, which would mean that the limit switch 66 had been activated since the previous interrupt, the microprocessor proceeds to determine the backup roll command.

If the backup roll is at the calibration point, and calibration is to be done, the presently known difference between the backup roll command position and its actual position is placed in temporary storage. The backup roll command position determination shall be described in more detail later. In proceeding with the calibration sequence, a new backup roll actual position value is established by adding one-half the incremental distance to the calibration position stored for the backup roll. As in regard to the knife carriage calibration sequence, this one-half of the incremental distance is added as the average amount of travel since the previous interrupt, at which time the limit switch 66 had not yet been contacted. A new backup roll command position is then established as the backup roll actual position, which has just been determined, plus the value from temporary storage. This value in temporary storage, it will be recalled, is the difference between the backup roll command and actual positions, and this differential is retained even after the backup roll actual position has been changed to the calibration point.

After the backup roll position has been established, the final interrupt subroutine is BACKUP ROLL COMMAND DATA, illustrated in FIGS. 11 through 15. Beginning with FIG. 11, the microprocessor checks to determine if the backup roll motor is on. If not, the microprocessor executes the MOTOR OFF MODE subroutine shown in FIG. 15. This subroutine merely sets the desired backup roll position equal to the actual position and outputs a command of no motion for the roller drive motor.

Figure 12:
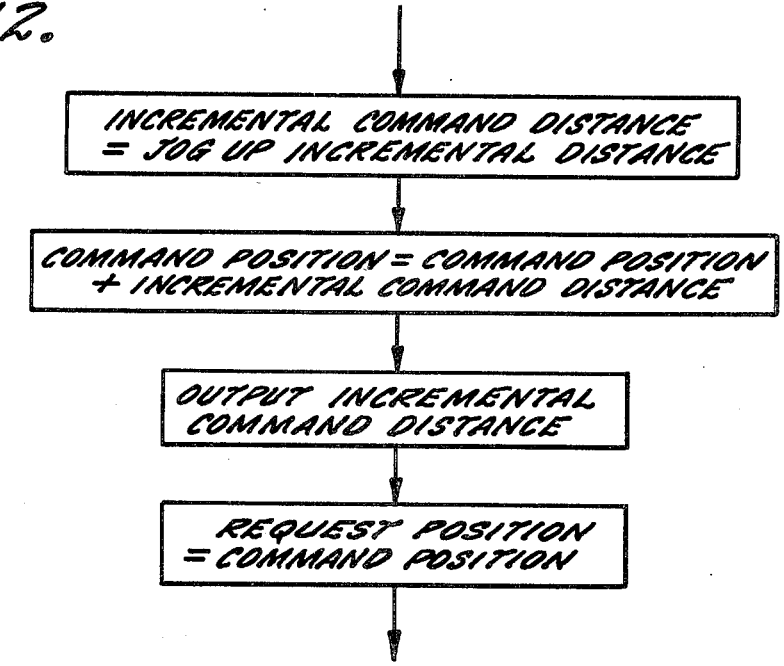
FIG. 12 is a flow chart of the jog up mode subroutine of FIG. 11.
Figure 13:
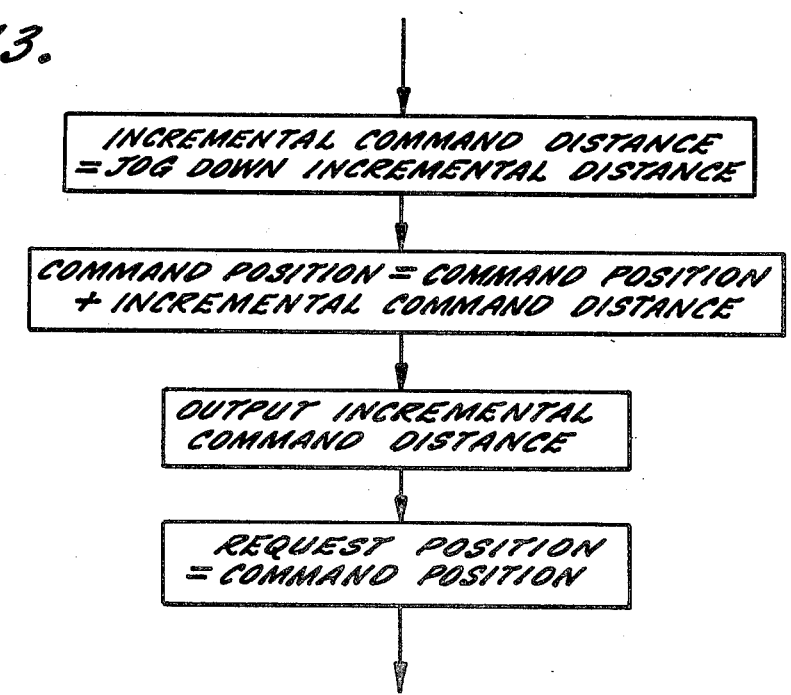
FIG. 13 is a flow chart of the jog down mode subroutine of FIG. 11.

Assuming that the motor is on, the microprocessor will command the roller drive motor to jog the backup roll up or down if one of these instructions has been input through the control panel. The JOG UP subroutine is shown in FIG. 12, and the JOG DOWN subroutine is illustrated in FIG. 13. In either case the microprocessor produces appropriate command signals to cause the backup roll carriage to move upwardly or downwardly independent of the knife position. The terms REQUEST POSITION and COMMAND POSITION shall be discussed in more detail in regard to the DETERMINE INCREMENTAL COMMAND DISTANCE subroutine of FIG. 14.

If the system is in the AUTO MODE, as selected through the control panel, the microprocessor produces control signals to effect the tracking of the backup roll with the knife blade. In the AUTO MODE a backup roll request position is determined based upon the just-determined knife actual position. Rather than establishing a request position which merely provides an equivalent roller motion to correspond to the knife motion, the request position for the backup roll is equal to the knife actual position as modified by an additional term. This term is the just-determined knife actual incremental distance multiplied by a constant. This is a "feed forward" term to offset the normal "lag" of the roller position behind the knife position in the servo loop.

If the system is not in the AUTO MODE, the microprocessor checks to see if the core limit has been reached, meaning that the log has been peeled to a minimum diameter, such as 4 inches. This condition may be signaled to the microprocessor by, for example, a switch or other means, and the microprocessor sets a request position as the backup roll's retracted position, rather than following the motion of the knife table as it retracts.

From the AUTO and CORE LIMIT decision blocks, after determining a backup roll request position, the microprocessor proceeds to the DETERMINE INCREMENTAL COMMAND DISTANCE subroutine of FIG. 14. In this subroutine the command signal which is used by the control hardware to control the roll drive motor 29 armature current is derived.

With reference now to FIG. 14, an incremental command distance is determined as the difference between the just-calculated request position for the backup roll minus the command position from the previous interrupt. If the absolute value of this incremental command distance is greater than an internally set maximum incremental command distance, reflecting the maximum possible response of the system to a command, then the incremental command distance is re-set to this (positive or negative) maximum. In any event, the incremental command distance determined is added to the previously determined command position from the previous interrupt to establish a new command position. This new command position is stored for the next interrupt period and the incremental command distance is output to the control hardware.

Figure 7:
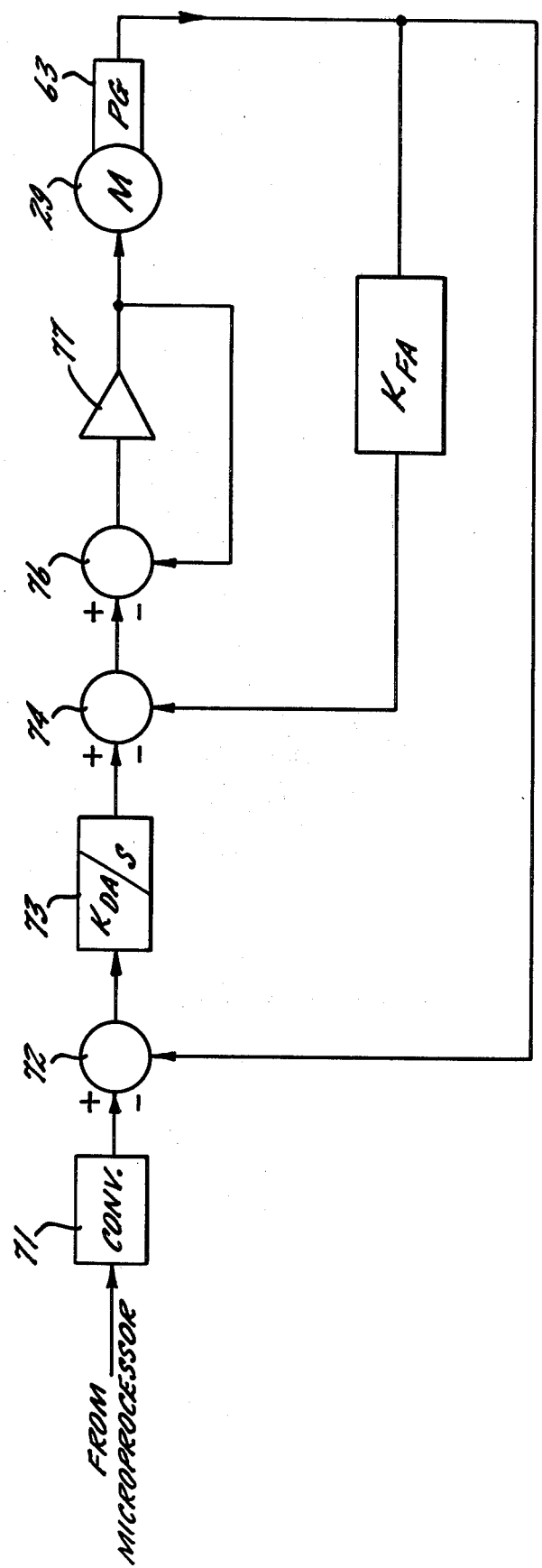
FIG. 7 is a schematic system block diagram for the hardware portion of the control of FIG. 6.

FIG. 7 is a schematic system block diagram of the hardware portion of the control 61. In the hardware portion the incremental command distance determined by the microprocessor portion of the control is coupled through appropriate interface circuitry and is in the form of a number of pulses produced for that interrupt period. A converter 71 converts this pulse count to an analogous frequency (in units of pulses per second) which is one input to a summing junction 72. The other input to the summing junction is in units of pulses per second, the pulses being coupled from the pulse generator 63 on the roll drive motor 29. This forms a position feedback loop. A difference between the command pulses and the pulses from the pulse generator is produced as an output from the summing junction 72 and coupled to an integrator (and digital-to-analog converter-amplifier) 73. The output of the integrator 73 is an analog signal representative of backup roll position error.

This analog position error signal serves as a velocity command, which is one input to a summing junction 74. The other input to the summing junction 74 is coupled from the output of the pulse generator 63. The pulse generator output is coupled through a frequency-to-analog converter-amplifier and serves as a velocity feedback loop. The differential output of the summing junction 74 is a velocity error analog signal which serves as an armature current command input to a summing junction 76. The other input to the summing junction 76 is a current feedback loop from the armature current line of the roll drive motor 29. The differential output of the summing junction 76 serves as a current error signal which is coupled to an amplifier control circuit 77, which controls the armature current for the motor 29 and thus the movement of the backup roll. The amplifier circuit 77 may be, for example, a variable phase firing SCR circuit.

While many types of specific hardware may be used to implement the system of FIG. 7, a suitable specific control system, including hardware and software, for controlling a drive axis in response to the position of a second drive axis is disclosed in the aforementioned U.S. patent application Ser. No. 149,527. In that application a control system is provided for controlling the knife drive in a veneer lathe in response to the rotation of the spindle drive.

What is claimed is:

1. A backup roll arrangement for laterally supporting a log in a high speed veneer lathe having a frame, headstock means for rotating a log in the frame, a knife carriage assembly mounted on the frame including an elongated knife and pressure bar extending parallel to the axis of rotation of the log, and means for advancing the knife carriage assembly toward the rotational axis of the log as the latter is rotated to peel veneer therefrom, comprising, in combination:

(a) means for determining the position of the knife relative to the axis of rotation of the log;
(b) a backup roll carriage mounted on the frame and a backup roll journaled on said carriage, the axis of rotation of said backup roll being substantially parallel to the axis of rotation of the log;
(c) guide means on the frame supporting said backup roll carriage for reciprocating motion causing said backup roll to move relative to the log in a plane passing through the rotational axis thereof, said plane being the plane of the forces tending to push up the log during the veneer cutting operation;
(d) means for determining the position of said backup roll relative to the axis of rotation of the log, and
(e) means for driving said backup roll carriage to position said backup roll adjacent the log dependent upon the knife position identified by the knife position determining means.

2. The arrangement of claim 1 in which the means for driving said backup roll carriage comprises a dc servo motor and the means for determining the position of said backup roll relative to the axis of rotation of the log comprises a pulse generator coupled to the shaft of said motor.

3. The arrangement of claim 2 in which the means for determining knife position comprises a pulse generator coupled to a dc motor for driving the knife carriage assembly, and the means for positioning said backup roll comprises a microprocessor-based control system which correlates position information from the knife motor pulse generator and the backup roll pulse generator to control the backup roll motor.

4. The arrangement of claim 1 in which said backup roll carriage carries a single backup roll.

* * * * *

UNITED STATES PATENT AND TRADEMARK OFFICE
CERTIFICATE OF CORRECTION

PATENT NO. : 4,396,049

DATED : August 2, 1983

INVENTOR(S) : Harry B. Calvert and Dewell M. Nelson

It is certified that error appears in the above-identified patent and that said Letters Patent is hereby corrected as shown below:

Column 3, line 33, delete "2-3" and substitute -- 2-2 --.

Signed and Sealed this

Twenty-fifth Day of October 1983

[SEAL]

Attest:

GERALD J. MOSSINGHOFF

Attesting Officer

Commissioner of Patents and Trademarks